June 5, 1956     C. A. DENNISON     2,749,157
PULLEY HUB
Filed July 23, 1952
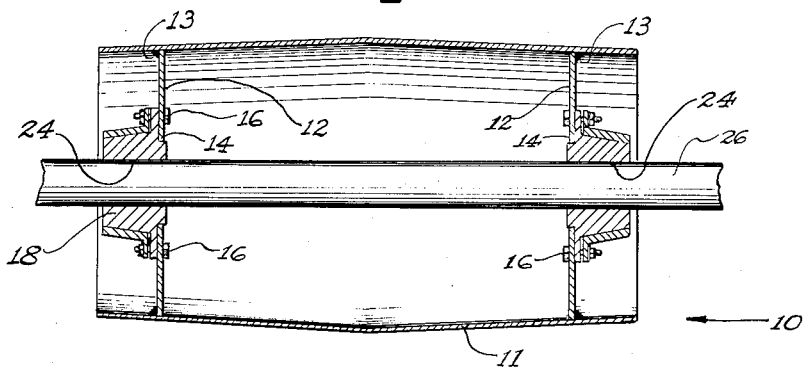
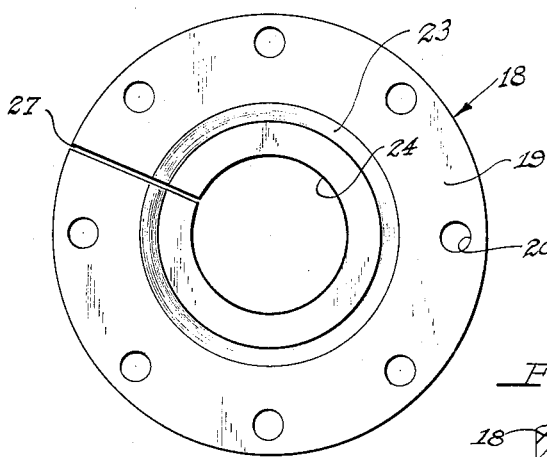
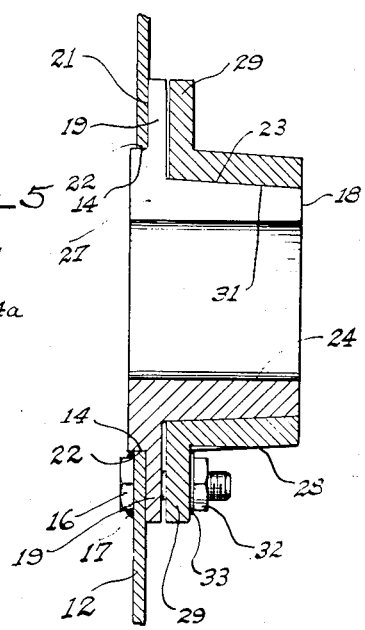
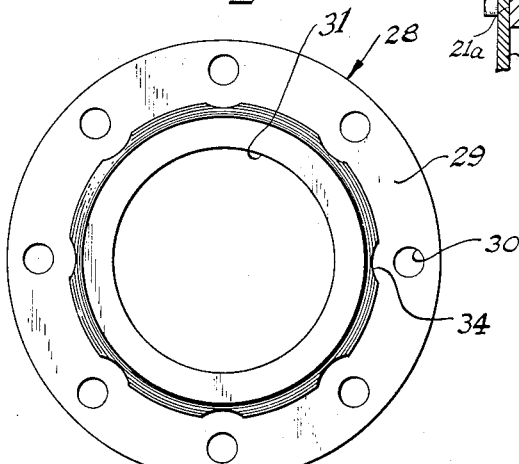
Inventor
Clifford A. Dennison United States Patent Office 2,749,157
Patented June 5, 1956

2,749,157

PULLEY HUB

Clifford A. Dennison, Itasca, Ill., assignor to Chain Belt Company, Milwaukee, Wis., a corporation of Wisconsin Application July 23, 1952, Serial No. 300,450

2 Claims. (Cl. 287—52.06)

The present invention relates generally to pulley driving apparatus and more particularly to an improved pulley hub assembly providing a friction driving connection with a shaft.

According to the general principles of the present invention, a pulley hub having an axial, cylindrical bore throughout its length is provided with an integral flange at one end having a plurality of circumferentially spaced apertures extending therethrough. The hub member is further provided with a tapered outer surface converging from the flange and towards the other end of the hub. The hub member abuts against the web of a pulley drum, the web carrying a plurality of threaded studs corresponding in alignment and number with the apertures in the flange, the studs being received in the apertures.

An outer sleeve is provided having inner tapered bore conforming in taper with the outer taper of the hub member. The sleeve includes an apertured flange adapted to be positioned so that the apertures of the flange are aligned with the apertures of the flange on the hub member. Nuts are threaded onto the studs and draw the two flanges together axially. By reason of the conforming tapered surfaces between the sleeve and the hub, a contractile action is produced because the hub is provided with a longitudinally extending slot or split portion. A shaft extending through the hub will thus be firmly engaged by the hub.

It is an object of the present invention to provide a pulley assembly having a hub member which will be secured by a friction lock securely to a shaft.

Another object of the present invention is to provide a pulley assembly which is made up of a reduced number of highly simplified elements which are economical to manufacture and which may be conveniently fabricated to provide a pulley assembly of high operative efficiency.

Many other advantages, features and additional objects of the present invention will become manifest to those versed in the art upon making reference to the detailed description which follows and the accompanying sheet of drawings in which a preferred structural embodiment of a pulley assembly incorporating the principles of the present invention is shown by way of illustrative example.

On the drawings:

Figure 1 is a cross-sectional view with parts shown in elevation of a pulley assembly incorporating the principles of the present invention;

Figure 2 is an end elevational view of a hub member provided in accordance with the principles of the present invention;

Figure 3 is an end elevational view of a sleeve member provided in accordance with the principles of the present invention;

Figure 4 is an enlarged cross-sectional view showing additional details of construction of the pulley assembly provided in accordance with the principles of the present invention; and Figure 5 is a fragmentary view showing a modified abutment joint between the web and the hub member provided in accordance with the principles of the present invention.

As shown on the drawings:

The pulley assembly of the present invention is indicated generally by the reference numeral 10 and includes a generally cylindrical drum 11 provided at each end with a radially inwardly extending annular web 12. The web 12 has an outer peripheral edge which is firmly secured to the drum 11, for example, by means of welding indicated at 13. The web 12 further includes an inner annular edge indicated at 14 which is surrounded by a plurality of circumferentially spaced fastening means.

In the preferred embodiment herein shown, each of the webs 12 is provided with a circumferential row of apertures equally spaced apart from one another and each aperture receiving a bolt or threaded stud 16 which may be placed in firm assembly with the web 12 by means of welding indicated at 17. The threaded stud 16 extends outwardly of the web 12.

According to the principles of the present invention, a hub member 18 is provided and includes a radially outwardly extending flange 19 having a row of circumferentially spaced apertures 20 corresponding in number and alignment to the threaded studs on the web 12 so as to facilitate assembly of the hub member 18 on the web 12.

On one face of the hub member 18 is provided an annular recess 21 providing a shoulder 22 against which the inner annular edge 14 of the web 12 abuts.

In the embodiment of Figure 4, the annular recess 21 is provided with a straight cylindrical surface providing a right angle shoulder 22, however, if desired, the structure may be modified in accordance with the embodiment shown in Figure 5 wherein the hub member 18 is provided with an annular recess 21a having a tapered surface forming a shoulder 22a against which a tapered inner annular surface 14a provided on the web may abut.

The hub member 18 further includes a tapered outer surface 23 which converges from the flange 19 at one end of the hub member 18 towards the other end of the hub member 18. The hub member 18 is further provided with an axially extending cylindrical bore 24 which receives a shaft 26 therethrough.

In order to promote radial contractibility of the hub member 18, a longitudinally extending slot 27 is provided in the hub member 18. Thus, to clamp the hub member 18 in firm assembly with the shaft 26, the hub member 18 is radially contracted thereby clamping the shaft 26 and the hub member 18 in co-rotatable assembly.

To effect such function, the assembly is completed by an outer sleeve 28 having a radially outwardly extending flange 29 provided with a plurality of circumferentially spaced apertures 30 corresponding in alignment and number with the apertures 20 in the flange 19 and with the studs 16 on the web 12. The sleeve member 28 includes an inner tapered bore 31 which corresponds and conforms with the outer taper of the outer tapered surface 23 on the hub member 18.

The sleeve member 28 embraces the hub member 18 and the apertures 30 in the flange 29 receive the ends of the studs 16. A nut 32 is threaded onto each of the studs 16 and may be turned against a lock washer 33 interposed between each of the nuts 32 and the flange 29 so as to draw the flanges 29 and 19 together axially. By reason of the conforming tapered surfaces 23 and 31, a contractile action is produced upon the split hub member 18 thereby causing the hub member 18 to engage firmly and to be retained securely on the shaft 26 passing through the bore 24 thereof.

In view of the relatively long cooperating tapered surfaces 23 and 31, the contractile forces developed by tightening up the nuts 32 on the threaded studs 16 will ordinarily be sufficient to lock the hub member 18 and shaft 26 in firm co-rotatable assembly.

The sleeve member 28 is provided with scalloped portions 34 which provide turning clearance for the nuts 32.

It will be understood that various structural modifications might be made to the preferred embodiment herein described by way of illustrative example only and that I wish to incorporate within the scope of the patent warranted hereon all such modifications as reasonably and properly come within the scope of my contribution to the art.

I claim as my invention:

1. In a pulley assembly, a drum provided at each end with a radially inwardly extending web, means firmly securing one of said webs to a shaft and means demountably coupling the other web to the shaft without creating excessive stresses in either of the webs, said last named means comprising a circular opening in said other web to receive a hub, a split hub having an axial bore for receiving the shaft, said hub having an annular flange adjacent one end abutting said other web and a tapered peripheral surface converging inwardly from one face of the flange toward the other end of the hub, a peripheral shoulder on said hub adjacent the other face of said flange fitting within said circular opening, a sleeve mounted on said hub having an inner tapered bore conforming with the outer taper on said hub, and a radial flange axially alined with the flange on said hub, circumferentially spaced openings in the flanges of said hub and sleeve alined with similar openings in said web, and tensioning members extending through said openings and engaging said web and the flange on said sleeve to draw the sleeve axially toward the web to contract said hub radially into clamping relation with the shaft.

2. In a pulley assembly, a drum provided at each end with a radially inwardly extending web, means firmly securing one of said webs to a shaft and means demountably coupling the other web to the shaft without creating excessive stresses in either of the webs, said last named means comprising a circular opening in said other web to receive a hub, a split hub having an axial bore for receiving the shaft, said hub also having an annular flange adjacent one end abutting said other web and a tapered peripheral surface converging inwardly from one face of the flange toward the other end of the hub, interfitting portions on said hub and said flange for locating the hub on the web, a sleeve mounted on said hub having an inner tapered bore conforming with the outer taper on said hub and a radial flange axially alined with the flange on said hub, circumferentially spaced openings in the flanges of said hub and sleeve alined with similar openings in said web, bolts mounted in said web extending through said openings, and nuts engaging said bolts arranged when tightened to bear against the flange on said sleeve to draw the sleeve axially toward the web and to cause the hub to contract radially on the shaft without producing axial movement of the hub even though the other web is rigidly connected to the shaft.

References Cited in the file of this patent

UNITED STATES PATENTS

| | | |
|---|---|---|
| 478,292 | Simcox | July 5, 1892 |
| 1,116,470 | Nelson | Nov. 10, 1914 |
| 1,371,666 | Close et al. | Mar. 15, 1921 |
| 1,398,020 | Holley | Nov. 22, 1921 |
| 1,656,935 | Bahan | Jan. 24, 1928 |
| 1,700,006 | Wallace et al. | Jan. 22, 1929 |
| 1,904,535 | Richards | Apr. 18, 1933 |
| 2,269,821 | Kemphert et al. | Jan. 13, 1942 |